(12) United States Patent
Ohata (10) Patent No.: US 10,975,797 B2
(45) Date of Patent: Apr. 13, 2021

(54) INTERNAL-COMBUSTION-ENGINE CONTROL DEVICE

(71) Applicant: HITACHI AUTOMOTIVE SYSTEMS, LTD., Hitachinaka (JP)

(72) Inventor: Eiichiro Ohata, Ibaraki (JP)

(73) Assignee: HITACHI AUTOMOVIE SYSTEMS, LTD., Ibaraki (JP)

(*) Notice: Subject to any disclaimer, the term of this patent is extended or adjusted under 35 U.S.C. 154(b) by 0 days.

(21) Appl. No.: 16/766,518

(22) PCT Filed: Nov. 8, 2018

(86) PCT No.: PCT/JP2018/041425
§ 371 (c)(1),
(2) Date: May 22, 2020

(87) PCT Pub. No.: WO2019/107103
PCT Pub. Date: Jun. 6, 2019

(65) Prior Publication Data
US 2020/0378331 A1    Dec. 3, 2020

(30) Foreign Application Priority Data

Nov. 28, 2017 (JP) .............................. JP2017-227914

(51) Int. Cl.
*F02D 35/02* (2006.01)
*F02D 41/28* (2006.01)
*F02D 45/00* (2006.01)

(52) U.S. Cl.
CPC ........... *F02D 45/00* (2013.01); *F02D 35/023* (2013.01); *F02D 2041/281* (2013.01);
(Continued)

(58) Field of Classification Search
CPC ................ F02D 35/023; F02D 35/024; F02D 2041/281; F02D 2041/283; F02D 2041/285; F02D 2041/286; F02D 2200/0618
(Continued)

(56) References Cited

U.S. PATENT DOCUMENTS

2012/0296558 A1   11/2012  Ono
2013/0338906 A1   12/2013  Akazaki et al.
(Continued)

FOREIGN PATENT DOCUMENTS

JP    H07-332150 A    12/1995
JP    2000-170590 A    6/2000
(Continued)

OTHER PUBLICATIONS

International Search Report and English Translation, PCT/JP2018/041425, dated Mar. 5, 2019, 4 pgs.

*Primary Examiner* — Erick R Solis
(74) *Attorney, Agent, or Firm* — Volpe Koenig (57) ABSTRACT

Provided is an internal-combustion-engine control device that minimizes a detection error of a cylinder pressure sensor used in a control of an internal combustion engine. The internal-combustion-engine control device is an electronic control unit (ECU) 1 for an internal combustion engine 100 that includes a cylinder pressure sensor 140 for detecting cylinder pressure in a combustion chamber. The ECU 1 includes an overall controller 81 configured to correct an output signal S2 transmitted from the cylinder pressure sensor 140 in a cylinder 150. The overall controller 81 corrects the output signal S2 from the cylinder pressure sensor 140 in accordance with a correction period calculated based on drive of components of the internal combustion engine 100, such as a fuel injector 400.

10 Claims, 7 Drawing Sheets

(52) U.S. Cl.
CPC .......... *F02D 2041/286* (2013.01); *F02D 2200/0618* (2013.01); *F02M 2200/247* (2013.01)

(58) Field of Classification Search
USPC .................. 701/103; 123/435; 73/114.16
See application file for complete search history.

(56) References Cited

U.S. PATENT DOCUMENTS

| | | | |
|---|---|---|---|
| 2016/0333813 A1 | 11/2016 | Shimatsu et al. | |
| 2017/0037791 A1* | 2/2017 | Kitagawa | F02D 41/28 |
| 2017/0074200 A1* | 3/2017 | Yamada | F02D 35/023 |
| 2017/0212000 A1* | 7/2017 | Duchemin | G01L 23/08 |

FOREIGN PATENT DOCUMENTS

| | | |
|---|---|---|
| JP | 2012-241554 A | 12/2012 |
| JP | 2014-001700 A | 1/2014 |
| JP | 2014-152740 A | 8/2014 |
| JP | 2016-056793 A | 4/2016 |
| JP | 2016-217181 A | 12/2016 |

\* cited by examiner

INTERNAL-COMBUSTION-ENGINE CONTROL DEVICE

TECHNICAL FIELD

The present invention relates to an internal-combustion-engine control device.

BACKGROUND ART

Techniques such as Lean-burn and Exhaust Gas Recirculation (EGR) have been developed in recent years for purposes of improving fuel economy for vehicles and increasing vehicle exhaust gas restriction. With the Lean-burn technique, a system is operated by air-fuel mixture leaner than a theoretical air-fuel ratio, and the EGR technique works by recirculating a part of exhaust gas after combustion back to the system.

With an internal combustion engine for such purposes of improving fuel economy and increasing exhaust gas restriction, an amount of fuel or air in a combustion chamber deviates from a theoretical value, causing the combustion in a cylinder to turn in an unstable state. Thus, the internal combustion engine includes a cylinder pressure sensor (also referred to as a combustion sensor) for detecting a combustion state of gas in the combustion chamber. The internal combustion engine detects the combustion state in the combustion chamber based on a measurement result by the cylinder pressure sensor.

However, in the internal combustion engine of this type, the cylinder pressure sensor may be affected by operating noise of a fuel injector or the like in the internal combustion engine, thereby resulting in an increased cylinder pressure detection error.

In view of the problem above, PTL 1 discloses an internal-combustion-engine control device that reduces an influence of operating noise of a fuel injector or the like in order to reduce a detection error of a cylinder pressure sensor.

CITATION LIST

Patent Literature

PTL 1: JP 2014-001700 A

SUMMARY OF INVENTION

Technical Problem

The internal-combustion-engine control device disclosed in PTL 1 calculates time at which the opening of the fuel injector starts (a starting time) and a length of time during which the fuel injector is in an open state (a length of time). Then, for the length of time from the starting time, the internal-combustion-engine control device does not use an actual measured value of the cylinder pressure sensor, but instead uses an average of measured values of the cylinder pressure sensor, the measured values acquired before the opening of the fuel injector. With this configuration, the internal-combustion-engine control device reduces the influence of the operating noise of the fuel injector so as to reduce the detection error of the cylinder pressure sensor.

However, with the internal-combustion-engine control device disclosed in PTL 1, in accordance with an operating state of the internal combustion engine or a magnitude of drive current for the fuel injector, the operating noise of the fuel injector varies in time of occurrence or in a length of time of occurrence, which hinders the reduction in the detection error of the cylinder pressure sensor.

In view of the respects described above, an object of the present invention is to minimize the detection error of the cylinder pressure sensor.

Solution to Problem

In order to achieve the object, the present invention provides an internal-combustion-engine control device for an internal combustion engine that includes a cylinder pressure sensor for detecting cylinder pressure in a combustion chamber. The internal-combustion-engine control device includes a correction processing unit configured to correct an output signal from the cylinder pressure sensor. In this internal-combustion-engine control device, the correction processing unit corrects the output signal from the cylinder pressure sensor in accordance with a correction period calculated based on drive of components of the internal combustion engine.

Advantageous Effects of Invention

The present invention provides an internal-combustion-engine control device that minimizes a detection error of a cylinder pressure sensor.

DESCRIPTION OF EMBODIMENTS

[Internal Combustion Engine]

First, an electronic control unit (ECU) 1 and an internal combustion engine 100, each according to an embodiment of the present invention, will be described. The electronic control unit (hereinafter, referred to as ECU) 1 includes a fuel injection controller 82, and controls the internal combustion engine 100. The internal combustion engine 100 may have a single cylinder or a plurality of cylinders. The embodiment will exemplarily describe a case where the internal combustion engine 100 has cylinders 150, the number of which is four. Each of the cylinders 150 is provided with a cylinder pressure sensor 140 for transmitting an output signal, and the output signal is to be corrected.

Figure 1:
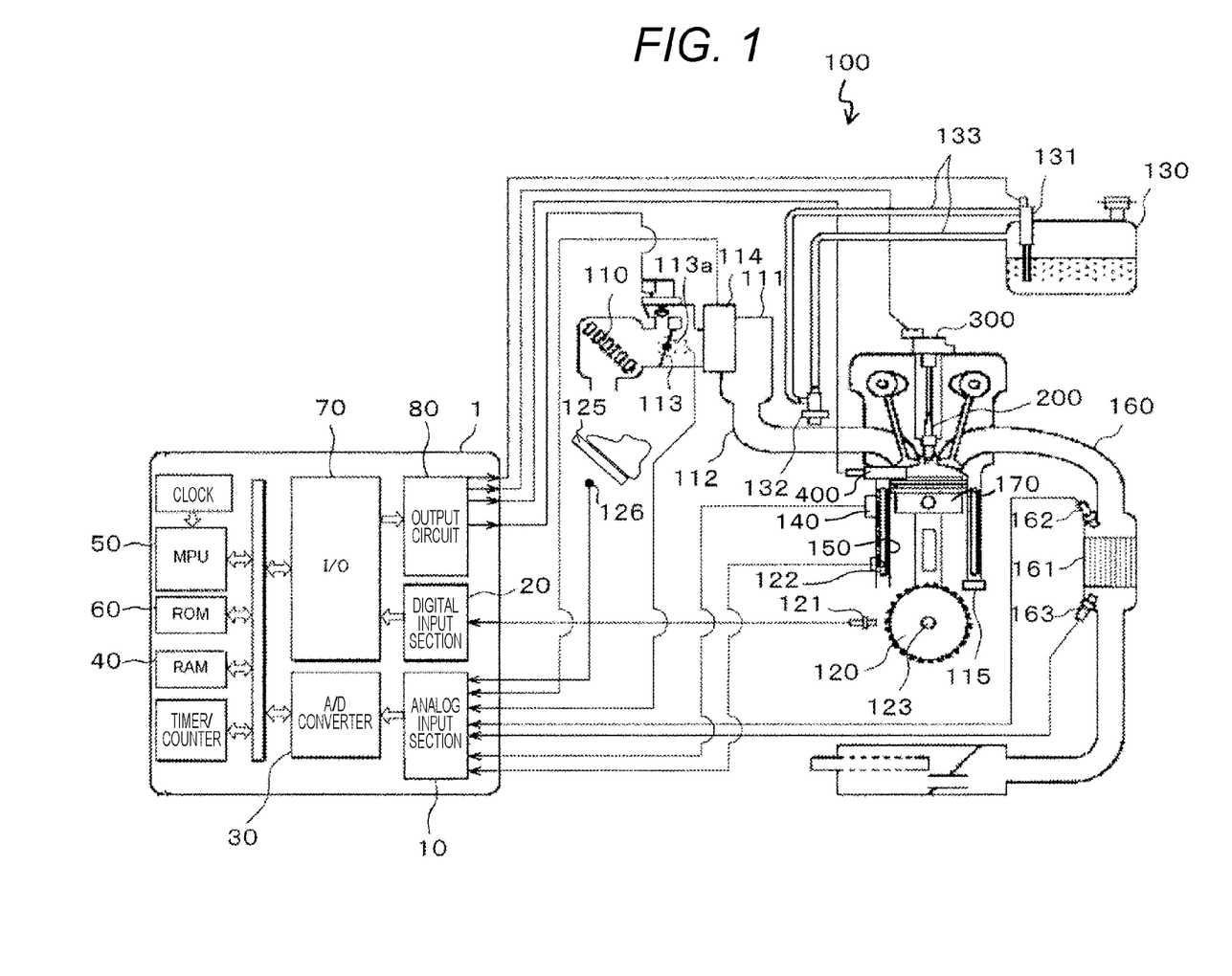
FIG. 1 is a diagram illustrating a main part configuration of each of an internal combustion engine according to an embodiment and an electronic control unit (ECU) according to the embodiment.

FIG. 1 is a diagram illustrating a main part configuration of the internal combustion engine 100 and the ECU 1.

As illustrated in FIG. 1, air taken from outside into the internal combustion engine 100 flows through an air cleaner 110, an intake pipe 111, and an intake manifold 112, and flows into each of cylinders 150. The air flowing into each of the cylinders 150 is adjusted in an amount by a throttle valve 113, and the amount of the air adjusted by the throttle valve 113 is measured by a flow sensor 114.

The throttle valve 113 includes a throttle opening sensor 113a for detecting an opening of the throttle valve 113, and information for the opening of the throttle valve 113 detected by the throttle opening sensor 113a is output to the ECU (Electronic Control Unit) 1.

Here, the throttle valve 113 is an electronic throttle valve driven by an electric motor, but any other system capable of adequately adjusting the flow rate of the air may be employed.

Temperature of the gas flowing into each of the cylinders 150 is detected by an intake air temperature sensor 115.

A ring gear 120 is mounted to a crank shaft 123, and at a radially outer side of the ring gear 120, a crank angle sensor 121 is disposed. The crank angle sensor 121 detects a rotational angle of the crank shaft 123. In the embodiment, the crank angle sensor 121 detects the rotational angle of the crank shaft 123 every 10 degrees of the rotation and at each combustion cycle.

A water temperature sensor 122 is provided to a water jacket (not illustrated) of a cylinder head, and the water temperature sensor 122 detects temperature of cooling water for the internal combustion engine 100.

The vehicle also includes an accelerator position sensor (APS) 126. The accelerator position sensor 126 detects a displacement amount (depression amount) of the accelerator pedal 125, thereby detecting driver request torque. The driver request torque detected by the accelerator position sensor 126 is output to the ECU 1 as will be described later. The ECU 1 controls the throttle valve 113 based on the driver request torque.

Fuel is stored in a fuel tank 130, and the fuel is pumped and pressurized by a fuel pump 131. Subsequently, the fuel flows through a fuel pipe 133 provided with a pressure regulator 132 to be drawn to the fuel injector 400. The pressure regulator 132 adjusts the fuel output from the fuel pump 131 to a predetermined pressure, and the fuel injector 400 injects the fuel into each of the cylinders 150.

The fuel injector 400 is controlled based on a fuel injection pulse (control signal) from the fuel injection controller 82 of the ECU 1 as will be described later.

Surplus fuel out of the fuel adjusted to the predetermined pressure by the pressure regulator 132 is returned to the fuel tank 130 via a return pipe (not illustrated).

[Fuel Injector]

Here, a specific configuration of the fuel injector 400 will be described.

Figure 2:
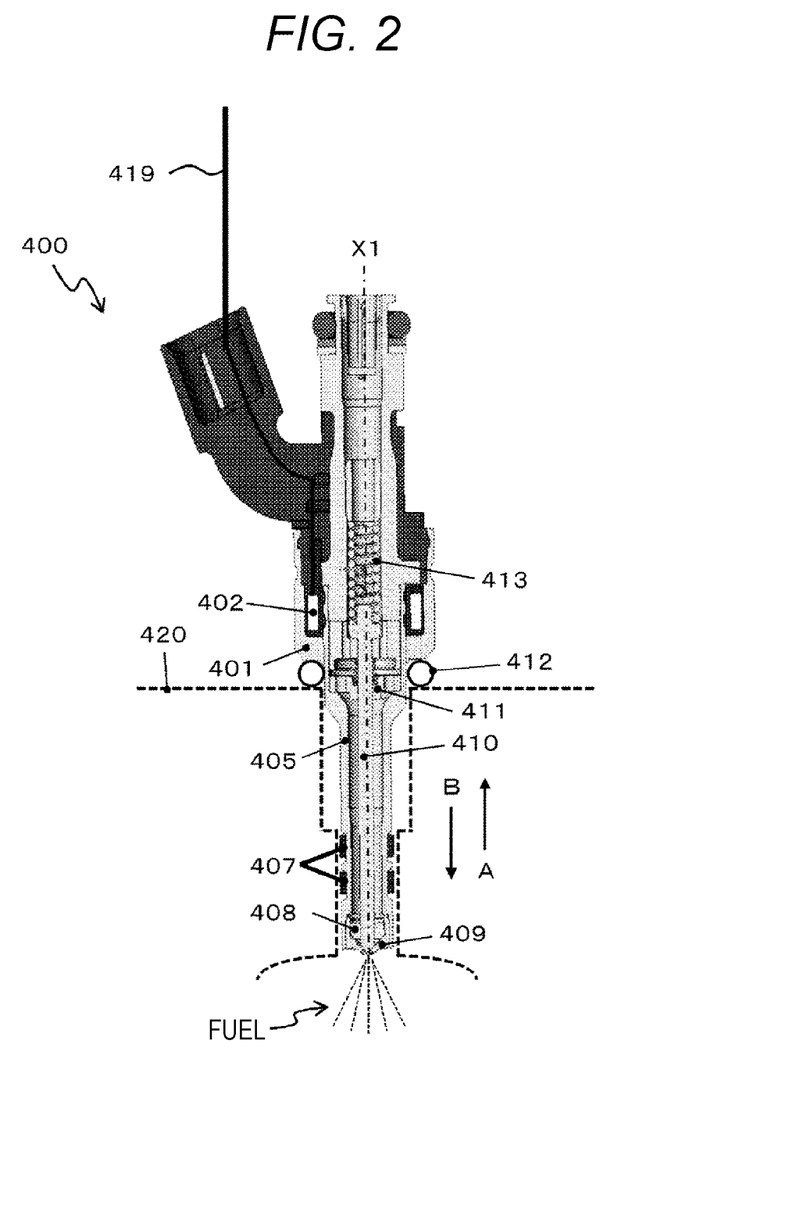
FIG. 2 is a sectional view illustrating a configuration of a fuel injector.

FIG. 2 is a sectional view illustrating the configuration of the fuel injector 400.

The fuel injector 400 is mounted to a cylinder head 420 from a side of a nozzle 405, and an area between the nozzle 405 and the cylinder head 420 is sealed with a ring seal 412 and a tip seal 407.

In the nozzle 405, a plunger rod 410 is slidably disposed along an axial direction of a central axis X1.

The fuel injection controller 82 transmits a fuel injection pulse S9 (control signal), based on which current is supplied to a coil 402 via a power line 419. Thus, electromagnetic force is generated in the coil 402, causing the plunger rod 410 to resist pressing force applied from a spring 413 and move in a direction A along the central axis X1. In this state, the plunger rod 410 is guided by a guide 408 and a guide 411.

This configuration forms a gap between a tip of the plunger rod 410 and an orifice cup 409, causing the fuel injector 400 to open. An amount of the movement of the plunger rod 410 with respect to the orifice cup 409 is referred to as a lift amount.

In the fuel injector 400, the lift amount of the plunger rod 410 is controlled in accordance with a magnitude of the current based on the fuel injection pulse S9. The amount of fuel injected from the fuel injector 400 is controlled in accordance with the lift amount of the plunger rod 410.

In the fuel injector 400, when the fuel injection pulse S9 transmitted from the fuel injection controller 82 stops, the current supplied to the coil 402 stops, and no electromagnetic force is generated in the coil 402. The plunger rod 410 is thereby pressed by the spring 413 in a direction B along the central axis X1.

With this configuration, the tip of the plunger rod 410 closes a through hole of the orifice cup 409, causing the fuel injector 400 to close. In this state, the fuel injector 400 stops injecting the fuel from the gap between the plunger rod 410 and the orifice cup 409.

In the fuel injector 400, the plunger rod 410 is pressed by the pressing force from the spring 413 in a closing direction, causing a bounce a plurality of times in response to a collision between the plunger rod 410 and the orifice cup 409. The bounce caused by the plunger rod 410 moving in the closing direction generates an impact. The impact is transmitted to the cylinder pressure sensor 140, thereby increasing a detection error of the cylinder pressure sensor 140.

The direction of arrow A along the central axis X1 (as previously described) is referred to as an opening direction of the fuel injector 400. The direction of arrow B (as previously described) is referred to as the closing direction of the fuel injector 400.

Referring back to FIG. 1, the internal combustion engine 100 includes the cylinder head (not illustrated) where a cylinder pressure sensor (CPS) 140 is disposed. The cylinder pressure sensor 140 is disposed in each of the cylinders 150 and detects internal pressure (combustion pressure) of the corresponding cylinder 150.

[Cylinder Pressure Sensor]

Figure 3:
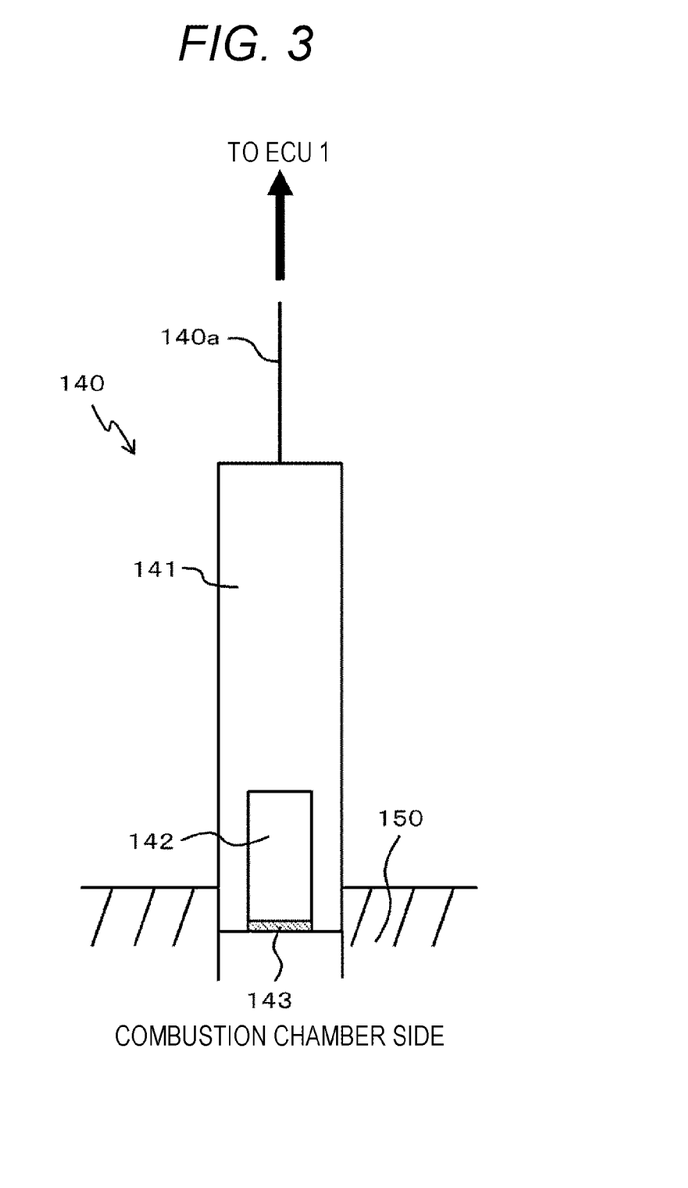
FIG. 3 is a schematic diagram illustrating a configuration of a cylinder pressure sensor.

FIG. 3 is a schematic diagram illustrating a configuration of the cylinder pressure sensor 140.

As illustrated in FIG. 3, the cylinder pressure sensor 140 includes a housing 141 of a cylindrical shape, and a pressure detection element 142 that is disposed at a tip part of the housing 141.

The pressure detection element 142 has, at its end, a diaphragm 143. The pressure detection element 142 converts a displacement of the diaphragm 143 into an electric signal (output signal S2).

The cylinder pressure sensor 140 is disposed such that the diaphragm 143 is located in a combustion chamber of each of the cylinders 150.

In the cylinder pressure sensor 140, the diaphragm 143 is displaced in accordance with the pressure in the combustion chamber of the corresponding cylinder 150, and the pressure detection element 142 converts the displacement of the diaphragm 143 into the output signal S2. The output signal S2 converted by the pressure detection element 142 is transmitted to an overall controller 81 of the ECU 1 via a signal line 140a.

The diaphragm 143 is deformed not only by the internal pressure of the corresponding cylinder 150 but also by oscillation transmitted from an external source, and the oscillation causes an error in the output signal S2 converted by the pressure detection element 142.

The cylinder pressure sensor 140 is a piezoelectric pressure sensor or a gauge pressure sensor, and is configured to detect the cylinder pressure of the corresponding cylinder 150 in a wide range of temperatures.

Referring back to FIG. 1, each of the cylinders 150 has an exhaust manifold 160 mounted for discharging combustion gas (exhaust gas) out of the corresponding cylinder 150. The exhaust manifold 160 has, on its exhaust side, a three-way catalyst 161. The exhaust gas is purified by the three-way catalyst 161 and then discharged to the atmosphere.

In upstream of the three-way catalyst 161, an upstream air-fuel ratio sensor 162 is disposed. The upstream air-fuel ratio sensor 162 continuously detects an air-fuel ratio of the exhaust gas discharged from each of the cylinders 150.

In downstream of the three-way catalyst 161, a downstream air-fuel ratio sensor 163 is disposed. The downstream air-fuel ratio sensor 163 outputs a detection signal that generally switches on/off in a vicinity of theoretical air-fuel ratio. In the embodiment, the downstream air-fuel ratio sensor 163 is an O2 sensor.

Additionally, at top of each of the cylinders 150, a spark plug 200 is disposed. The spark plug 200 discharges (sparks) to ignite air-fuel mixture in each of the cylinders 150, causing an explosion in the corresponding cylinder 150. In this state, a piston 170 is pushed down. When the piston 170 is pushed down, the crank shaft 123 rotates.

Each of various sensors described above, such as the throttle opening sensor 113a, the flow sensor 114, the crank angle sensor 121, the accelerator position sensor 126, the water temperature sensor 122, and the cylinder pressure sensor 140, outputs an output signal to the ECU 1. The ECU 1 detects an operating state of the internal combustion engine 100 based on the output signal from each of the various sensors, and controls the amount of air sent into each of the cylinders 150, the amount of fuel injected from the fuel injector 400, an ignition timing of the spark plug 200, and the like.

[Hardware Configuration of ECU]

Next, an overall hardware configuration of the ECU 1 will be described.

As illustrated in FIG. 1, the ECU 1 includes an analog input section 10, a digital input section 20, an A/D (analog/digital) converter 30, a RAM (random access memory) 40, a MPU (micro-processing unit) 50, a ROM (read only memory) 60, an I/O (input/output) port 70, and an output circuit 80.

The analog input section 10 receives an analog output signal from each of the various sensors, such as the throttle opening sensor 113a, the flow sensor 114, the accelerator position sensor 126, the upstream air-fuel ratio sensor 162, the downstream air-fuel ratio sensor 163, the cylinder pressure sensor 140, and the water temperature sensor 122.

The analog input section 10 is connected to the A/D converter 30. The analog output signal from each of the various sensors is input into the analog input section 10 and subjected to signal processing, e.g., noise removal. Subsequently, the analog output signal is converted into a digital signal by the A/D converter 30 and is stored in the RAM 40.

The digital input section 20 receives a digital output signal from the crank angle sensor 121.

The digital input section 20 is connected to the I/O port 70. The digital output signal is input into the digital input section 20 and is stored in the RAM 40 via the I/O port 70.

Each of the output signals stored in the RAM 40 is subjected to an arithmetic operation in the MPU 50.

The MPU 50 executes a control program (not illustrated) stored in the ROM 60, and provides the arithmetic operation on each of the output signals stored in the RAM 40 based on the control program. The MPU 50 calculates a control value based on the control program. The control value specifies an operation amount of each actuator driving the internal combustion engine 100 (e.g., the throttle valve 113, the pressure regulator 132, or the spark plug 200), and is temporarily stored in the RAM 40.

The control value, which specifies the operation amount of the actuator and is stored in the RAM 40, is subsequently output to the output circuit 80 via the I/O port 70.

The output circuit 80 includes functions, such as the overall controller 81, the fuel injection controller 82, and an ignition controller 83. The overall controller has an overall control of the internal combustion engine 100 based on the output signal from each of the various sensors (e.g., the cylinder pressure sensor 140). The fuel injection controller 82 (see FIG. 3) controls drive of the plunger rod 410 (see FIG. 2) of the fuel injector 400. The ignition controller 83 (see FIG. 4) controls voltage applied to the spark plug 200.

[Functional Block of ECU]

Next, a functional configuration of the ECU 1 will be described.

Figure 4:
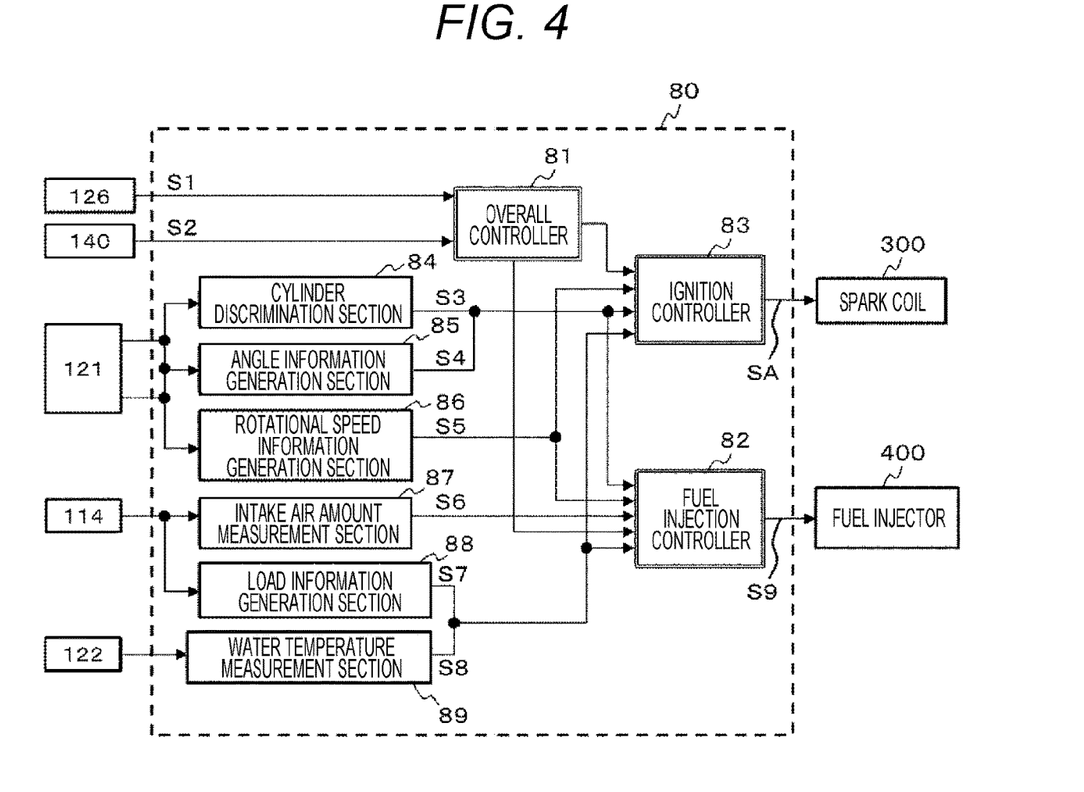
FIG. 4 is a block diagram showing a functional configuration of the electronic control unit (ECU).

FIG. 4 is a block diagram showing a functional configuration of the ECU 1.

In the ECU 1, the MPU 50 executes the control program stored in the ROM 60 to achieve various functions in the output circuit 80. This configuration causes the fuel injection controller 82 in the output circuit 80 to control the fuel injector 400 and causes the ignition controller 83 in the output circuit 80 to control the discharge of the spark plug 200.

As shown in FIG. 4, the output circuit 80 in the ECU 1 includes the overall controller 81, the fuel injection controller 82, and the ignition controller 83.

[Overall Controller]

The overall controller 81 is connected to the accelerator position sensor 126 and the cylinder pressure sensor 140, and receives the driver request torque (an acceleration signal S1) from the accelerator position sensor 126 and the output signal S2 from the cylinder pressure sensor 140.

Further, the overall controller 81 corrects the output signal S2 from the cylinder pressure sensor 140 based on a correction period predetermined. A method for correcting the output signal S2 from the cylinder pressure sensor 140 by the overall controller 81 will be described later. The overall controller 81 of the embodiment has a function as a correction processing unit according to the present invention.

The overall controller 81 has an overall control of the fuel injection controller 82 and the ignition controller 83 based on the driver request torque (acceleration signal S1) from the accelerator position sensor 126 and the output signal S2 from the cylinder pressure sensor 140.

[Ignition Controller]

The ignition controller 83 is connected to and receives information from the overall controller 81, a cylinder discrimination section 84, an angle information generation section 85, a rotational speed information generation section 86, a load information generation section 88, and a water temperature measurement section 89.

Based on the information received, the ignition controller 83 calculates an amount of current (angle of current flow) supplied to a primary coil 310 of a spark coil 300, time to start the current flow, and time to cut off the current supplied to the primary coil 310 (ignition time).

Then, based on the amount of the current flow, the time to start the current flow, and the ignition time calculated, the ignition controller 83 outputs an ignition signal S to the primary coil 310 of the spark coil 300 to control the discharge of the spark plug 200.

[Fuel Injection Controller]

The fuel injection controller 82 is connected to each of the cylinder discrimination section 84, the angle information generation section 85, and the rotational speed information generation section 86. The cylinder discrimination section 84 discriminates each of the cylinders 150 of the internal combustion engine 100, and provides cylinder discrimination information S3 to the fuel injection controller 82. The angle information generation section 85 measures a crank angle of the crank shaft 123, and provides crank angle information S4 to the fuel injection controller 82. The rotational speed information generation section 86 measures engine rotational speed, and provides engine rotational speed information S5 to the fuel injection controller 82.

Further, the fuel injection controller 82 is connected to each of an intake air amount measurement section 87, the load information generation section 88, and the water temperature measurement section 89. The intake air amount measurement section 87 measures an intake amount of the air taken into each of the cylinders 150, and provides intake air amount information S6 to the fuel injection controller 82. The load information generation section 88 measures engine load, and provides engine load information S7 to the fuel injection controller 82. The water temperature measurement section 89 measures the temperature of engine cooling water, and provides cooling water temperature information S8 to the fuel injection controller 82.

Based on each of the information received, the fuel injection controller 82 calculates the amount of fuel injected from the fuel injector 400 and time taken for the fuel injection. Then, based on the amount and the time for the fuel injection calculated, the fuel injection controller 82 generates and transmits the fuel injection pulse S9 to the fuel injector 400.

Here, the cylinder pressure sensor 140 is provided in the internal combustion engine 100 as previously described, and has characteristics of indicating a larger detection value as oscillation frequency increases. In the internal combustion engine 100, during the combustion of the air-fuel mixture in each of the cylinders 150, the oscillation frequency is within a low frequency range. In this state, the cylinder pressure sensor 140 has low sensitivity, and thus is prone to an increased detection error in combustion pressure (cylinder pressure).

The inventor of this application has identified, as a result of earnest research, in order to further improve accuracy in controlling the fuel injection from the fuel injector 400 and/or accuracy in controlling the ignition of the spark plug 200, accurately grasping a combustion state in each of the cylinders 150 is important, and in order to achieve this, the combustion pressure (cylinder pressure that is generated by the combustion) in each of the cylinder 150 needs to be accurately detected.

[Main Part Configuration of Internal Combustion Engine]

Figure 5:
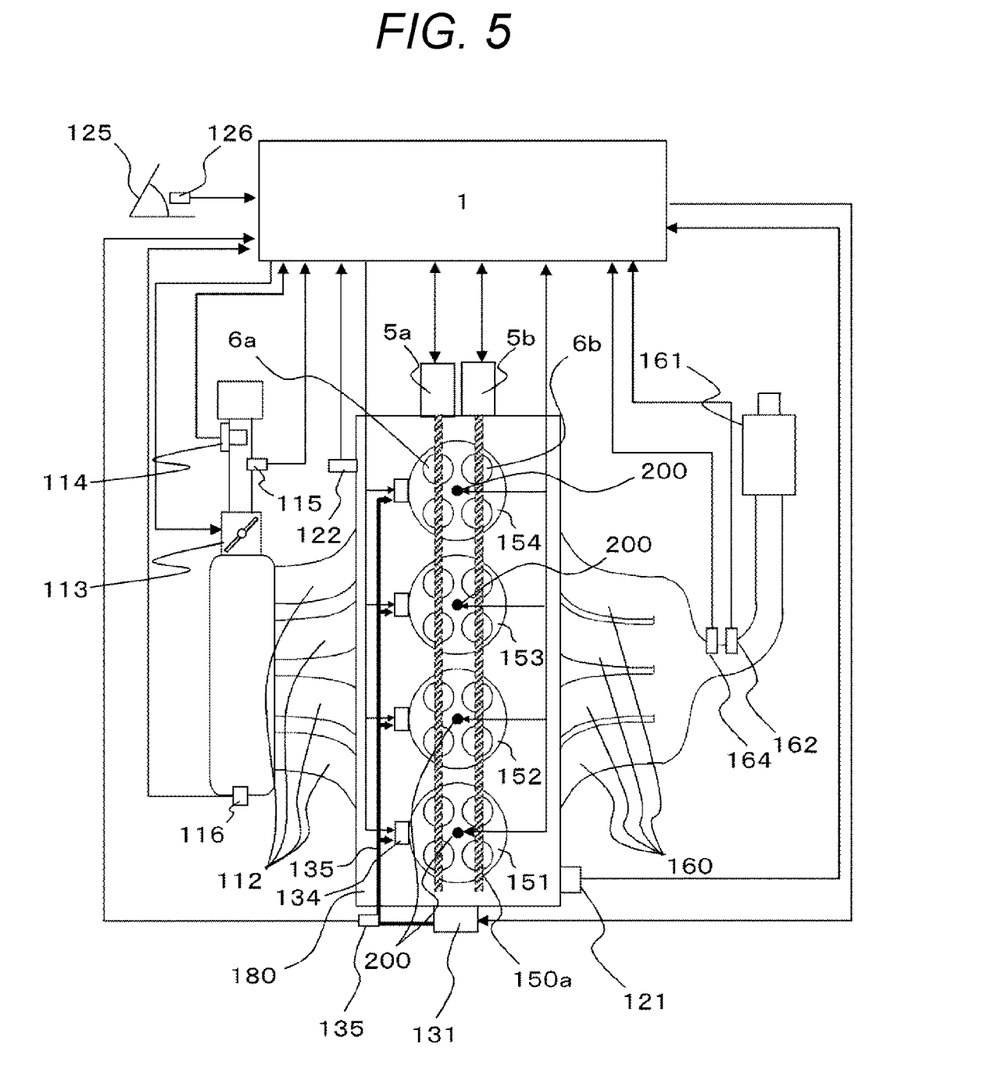
FIG. 5 is a schematic diagram illustrating a main part configuration of the internal combustion engine to which the electronic control unit (ECU) is applied.

Next, a main part configuration of the internal combustion engine 100, to which the ECU 1 according to the embodiment is applied, will be described. Here, the internal combustion engine 100 is a cylinder-injection type, four-cylinder vehicle gasoline engine.

FIG. 5 is a schematic diagram illustrating the main part configuration of the internal combustion engine 100 (cylinder-injection type, four-cylinder vehicle gasoline engine) to which the ECU 1 is applied.

Figure 6:
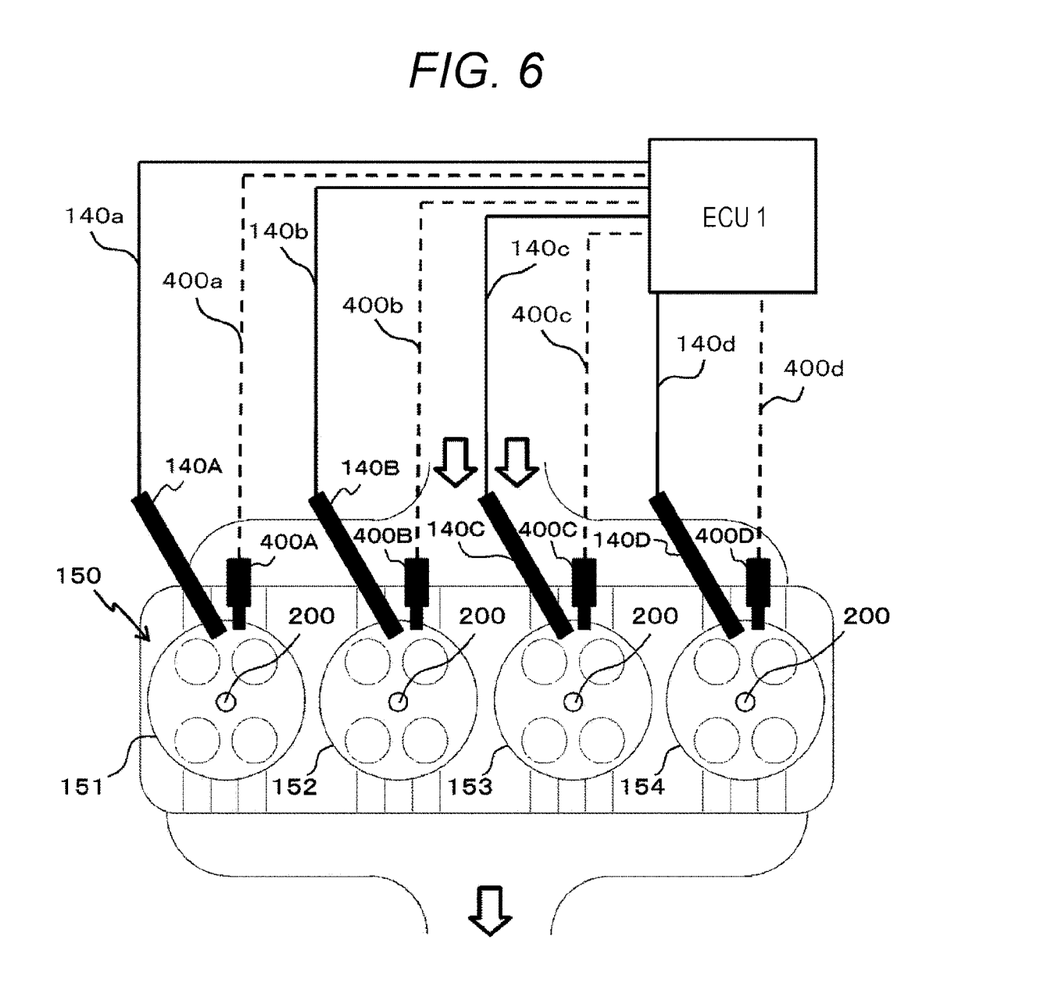
FIG. 6 is a plan view illustrating an arrangement of each of cylinders.

FIG. 6 is a plan view illustrating an arrangement of each of the cylinders 150.

As illustrated in FIG. 5, the embodiment will exemplarily describe a case where the internal combustion engine 100 is an in-line, four-cylinder vehicle gasoline engine with spark ignition combustion.

The internal combustion engine 100 has a first cylinder 151, a second cylinder 152, a third cylinder 153, and a fourth cylinder 154, all provided in series on a cylinder block (not illustrated). Hereinafter, each of the first cylinder 151, the second cylinder 152, the third cylinder 153, and the fourth cylinder 154 is, when not particularly distinguished from the others, simply referred to as each of the cylinders 150.

Each of the cylinders 150 has a combustion chamber 150a where the spark plug 200, the cylinder pressure sensor 140, and the fuel injector 400 are mounted (see FIG. 6). When the internal combustion engine 100 is an in-line four-cylinder engine, in the combustion chamber 150a of each of the cylinders 150, ignition and combustion of the spark plug 200 takes place at every 180 degrees of the rotational angle of the crank shaft 123. The combustion in each of the cylinders 150 takes place in a sequential order of the first cylinder 151, the third cylinder 153, the fourth cylinder 154, and the second cylinder 152.

Pressure of the air flowing into each of the cylinders 150 is measured by an intake pressure sensor 116 provided to the intake manifold 112.

Above each of the cylinders 150, a cylinder head 180 is disposed. The cylinder head 180 has an intake camshaft 5a and an exhaust camshaft 5b provided. The intake camshaft 5a operates an intake valve 6a for adjusting intake of the air-fuel mixture (mixture of air and fuel) into the corresponding cylinder 150. The exhaust camshaft 5b operates an exhaust valve 6b for adjusting exhaust of the exhaust gas from the corresponding cylinder 150.

As illustrated in FIG. 6, in the internal combustion engine 100, the first cylinder 151, the second cylinder 152, the third cylinder 153, and the fourth cylinder 154 are respectively provided with a cylinder pressure sensor 140A, a cylinder pressure sensor 140B, a cylinder pressure sensor 140C, and a cylinder pressure sensor 140D. The first, second, third, and fourth cylinders 151, 152, 153, and 154 are also respectively provided with a fuel injector 400A, a fuel injector 400B, a fuel injector 400C, and a fuel injector 400D. The cylinder pressure sensors 140A to 140D are respectively disposed in correspondence to and at a short distance from the fuel injectors 400A to 400D.

Hereinafter, each of the cylinder pressure sensors 140A, 140B, 140C, and 140D is, when not particularly distinguished from the others, simply referred to as the cylinder pressure sensor 140. Similarly, each of the fuel injectors 400A, 400B, 400C, and 400D is, when not particularly distinguished from the others, is simply referred to as the fuel injector 400.

With this configuration, in the internal combustion engine 100, oscillation or distortion may be generated in response to the drive of the plunger rod 410 in each of the fuel injectors 400A to 400D and transmitted to the cylinder pressure sensors 140A to 140D, through components of the internal combustion engine 100 such as the cylinder head. In this case, each of the cylinder pressure sensors 140A to 140D is affected by the oscillation or the distortion due to the plunger rod 410, and thus results in an increased oscillation detection error of the cylinder pressure sensors 140A to 140D.

Further, in the internal combustion engine 100, the cylinder pressure sensors 140A, 140B, 140C, and 140D respectively have the signal line 140A, a signal line 140B, a signal line 140C, and a signal line 140D (solid lines in FIG. 6), all of which are connected to the ECU 1. Similarly, The fuel injectors 400A, 400B, 400C, and 400D respectively have a power line 400A a power line 400B, a power line 400C, and a power line 400D (broken lines in FIG. 6), all of which are connected to the ECU 1. With this configuration, a change in current of each of the power lines 400A to 400D generates electromagnetic induction, and as a result, the output signal S2 transmitted from each of the cylinder pressure sensors 140A to 140D through the corresponding signal lines 140A to 140D to the ECU 1 is affected. Accordingly, the electromagnetic induction generated by each of the power lines 400A to 400D is another factor for the oscillation detection errors of the cylinder pressure sensors 140A to 140D.

[Method for Correcting Output Signal from Cylinder Pressure Sensor]

Next, a method for correcting the output signal S2 from the cylinder pressure sensor 140 according to the embodiment will be described.

Figure 7:
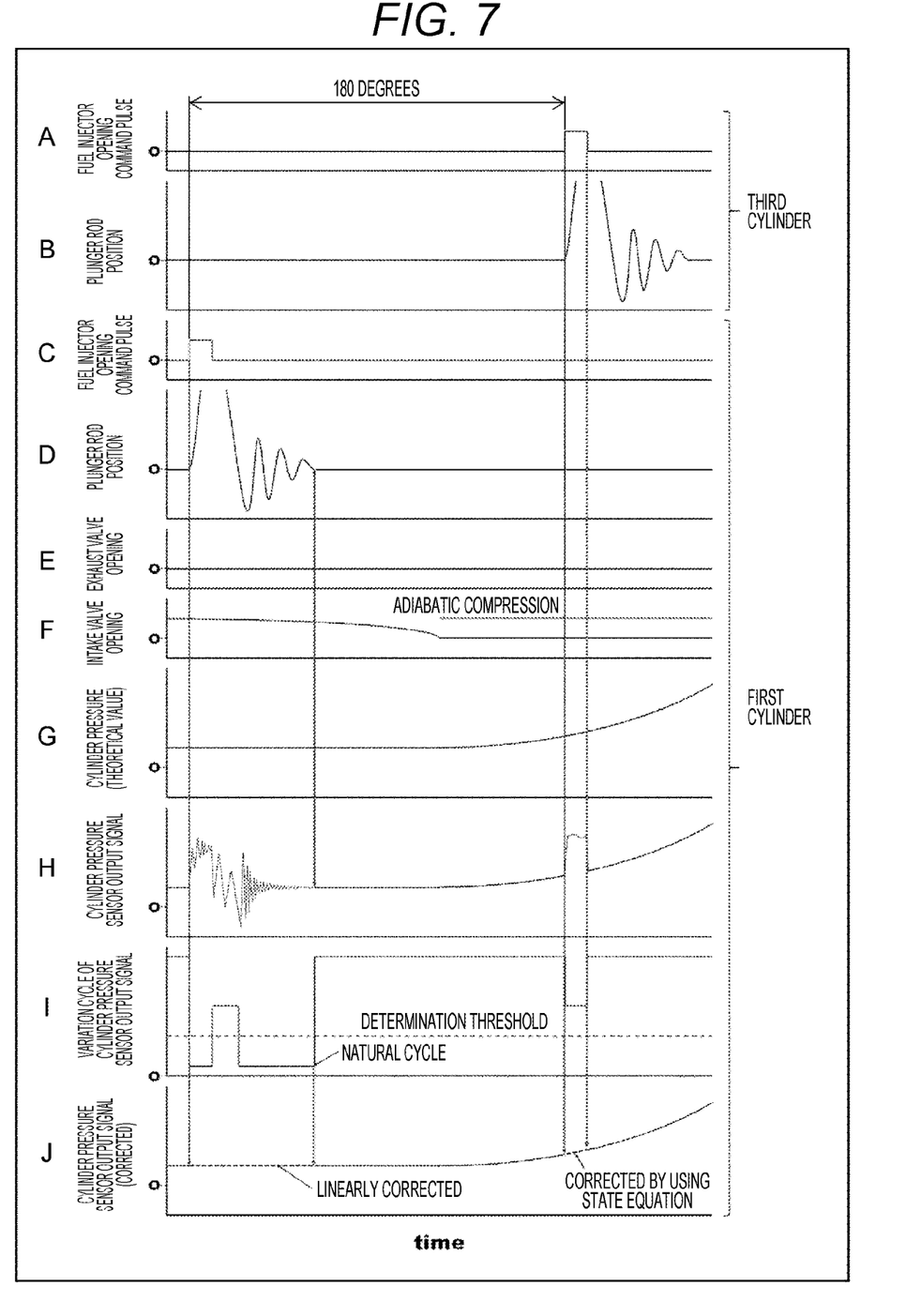
FIG. 7 is a diagram showing a method for correcting an output signal from the cylinder pressure sensor.

FIG. 7 is a diagram showing the method for correcting the output signal S2 from the cylinder pressure sensor 140.

Descriptions below will focus on the first cylinder 151 that undergoes a combustion stroke first, and the third cylinder 153 that undergoes the combustion stroke after the first cylinder 151. Then, the descriptions below will exemplarily describe a case where the output signal S2 from the cylinder pressure sensor 140A in the first cylinder 151 is corrected.

In FIG. 7, the diagram in an A stage shows an opening command pulse (the fuel injection pulse S9 previously described) for commanding the opening of the plunger rod 410 (the fuel injector 400C) in the third cylinder 153. The opening command pulse is transmitted from the fuel injection controller 82.

As shown in the A stage of FIG. 7, when a signal voltage of the opening command pulse transmitted from the fuel injection controller 82 changes from 0 V to 5 V, a driver circuit (not shown) in the fuel injection controller 82 generates drive electric power in the coil 402 of the fuel injector 400C. On the other hand, when the signal voltage of the opening command pulse transmitted from the fuel injection controller 82 changes from 5 V to 0 V, the driver circuit (not shown) in the fuel injection controller 82 stops supplying the drive electric power to the coil 402.

The diagram in a B stage of FIG. 7 shows a position of the plunger rod 410 of the fuel injector 400C.

As shown in the B stage of FIG. 7, when the opening command pulse from the fuel injection controller 82 changes from 0 V to 5 V and accordingly the driver circuit (not shown) in the fuel injection controller 82 accordingly generates the drive electric power in the coil 402 of the fuel injector 400C, the plunger rod 410 moves in the opening direction along the central axis X1 (direction of arrow A in FIG. 2) to cause the fuel injector 400C to open.

On the other hand, when the opening command pulse from the fuel injection controller 82 changes from 5 V to 0 V and the driver circuit (not shown) in the fuel injection controller 82 accordingly stops supplying the drive electric power to the coil 402 of the fuel injector 400C, the plunger rod 410 moves in the closing direction (direction of arrow B in FIG. 2) to cause the fuel injector 400C to close.

Here, in the fuel injector 400C, the plunger rod 410 is pressed by the pressing force from the spring 413 to move in the closing direction (see FIG. 2). The plunger rod 410 is then seated on the orifice cup 409, causing the collision therebetween, and thus the bounce of the plunger rod 410 is generated.

In this state, due to the plunger rod 410 moving in the closing direction, the fuel injector 400C needs a certain amount of time to fully close.

The diagram in a C stage of FIG. 7 shows an opening command pulse (the fuel injection pulse S9 previously described) for commanding the opening of the plunger rod 410 (the fuel injector 400A) in the first cylinder 151. The opening command pulse is transmitted from the fuel injection controller 82.

As shown in the C stage of FIG. 7, when a signal voltage of the opening command pulse transmitted from the fuel injection controller 82 changes from 0 V to 5 V, the driver circuit (not shown) in the fuel injection controller 82 generates drive electric power in the coil 402 of the fuel injector 400A. On the other hand, when the signal voltage of the opening command pulse transmitted from the fuel injection controller 82 changes from 5 V to 0 V, the driver circuit (not shown) in the fuel injection controller 82 stops supplying the drive electric power to the coil 402.

Note that, the first cylinder 151 undergoes the combustion stroke earlier by a single stroke than the timing at which the third cylinder 153 undergoes the combustion stroke. Accordingly, the fuel injection controller 82 outputs the opening command pulse to the fuel injector 400A of the first cylinder 151 earlier by a phase difference of 180 degrees of the crank angle than the timing at which the fuel injection controller 82 outputs the opening command pulse to the fuel injector 400C of the third cylinder 153.

The diagram in a D stage of FIG. 7 shows a position of the plunger rod 410 of the fuel injector 400A.

As shown in the D stage of FIG. 7, when the opening command pulse from the fuel injection controller 82 changes from 0 V to 5 V and the driver circuit (not shown) in the fuel injection controller 82 accordingly generates the drive electric power in the coil 402 of the fuel injector 400A, the plunger rod 410 moves in the opening direction along the central axis X1 (direction of arrow A in FIG. 2) to cause the fuel injector 400A to open.

On the other hand, when the opening command pulse from the fuel injection controller 82 changes from 5 V to 0 V and the driver circuit (not shown) in the fuel injection controller 82 accordingly stops supplying the drive electric power to the coil 402 of the fuel injector 400A, the plunger rod 410 moves in the closing direction (direction of arrow B in FIG. 2) to cause the fuel injector 400A to close.

Here, in the fuel injector 400A, the plunger rod 410 is pressed by the pressing force from the spring 413 to move in the closing direction (see FIG. 2). The plunger rod 410 is then seated on the orifice cup 409, causing the collision therebetween, and thus the bounce of the plunger rod 410 is generated.

In this state, due to the plunger rod 410 moving in the closing direction, the fuel injector 400A needs a certain amount of time to fully close.

Note that, as previously described, the first cylinder 151 undergoes the combustion stroke earlier by a single stroke than the timing at which the third cylinder 153 undergoes the combustion stroke. Accordingly, the plunger rod 410 of the fuel injector 400A in the first cylinder 151 is commanded to move earlier by a phase difference of 180 degrees of the crank angle than the timing at which the plunger rod 410 of the fuel injector 400C in the third cylinder 153 is commanded to move.

The diagram in an E stage of FIG. 7 shows an opening of the exhaust valve 6*b* (see FIG. 5) in the first cylinder 151. As shown in the E stage of FIG. 7, in the embodiment, the exhaust valve 6*b* is in a closed state.

The diagram in an F stage of FIG. 7 shows an opening of the intake valve 6*a* (see FIG. 5) in the first cylinder 151. As shown in the F stage of FIG. 7, the intake valve 6*a* is initially in an open state and then turns into a closed state in a middle of the F stage.

The diagram in a G stage of FIG. 7 shows a theoretical value of the cylinder pressure in the first cylinder 151. As shown in the G stage of FIG. 7, during an intake stroke, the intake valve 6*a* is in the open state, and thus the cylinder pressure is constant regardless of cylinder volume. When the intake valve 6*a* closes, the amount of air in the cylinder becomes constant, causing a change in the pressure due to adiabatic change.

(The pressure increases as the cylinder volume decreases.)

The diagram in an H stage of FIG. 7 shows the output signal S2 from the cylinder pressure sensor 140A in the first cylinder 151.

As shown in the H stage of FIG. 7, the output signal S2 from the cylinder pressure sensor 140A deviates from the theoretical value of the cylinder pressure (in the G stage of FIG. 7) during a period that the opening command pulse transmitted from the fuel injection controller 82 to the fuel injector 400C in the third cylinder 153 changes from 0 V to 5 V.

The reason therefor is as follows: the opening command pulse transmitted to the fuel injector 400C causes the change in current of the power line 400*c* connected to the fuel injector 400C, and the electromagnetic induction is generated. As a result, the output signal S2 transmitted through the signal line 140*c* from the cylinder pressure sensor 140C is affected.

Further, the output signal S2 from the cylinder pressure sensor 140A deviates from the theoretical value of the cylinder pressure (in the G stage of FIG. 7) during a period from the timing, at which the opening command pulse transmitted from the fuel injection controller 82 to the fuel injector 400A in the first cylinder 151 changes from 0 V to 5 V, until the bounce of the plunger rod 410 of the fuel injector 400A settles (until the change in position of the plunger rod 410 turns zero).

The reason therefor is as follows: similarly to the description above, the opening command pulse transmitted to the fuel injector 400A causes the change in current of the power line 400*a* connected to the fuel injector 400A, and the electromagnetic induction is generated. As a result, the output signal S2 transmitted through the signal line 140*a* from the cylinder pressure sensor 140A is affected. In addition, the bounce of the plunger rod 410 (change in the position of the plunger rod 410) causes the distortion or the oscillation of the components (e.g., cylinder head 180) between the fuel injector 400A (plunger rod 410) and the cylinder pressure sensor 140A in the internal combustion engine 100. The distortion or the oscillation is then transmitted to the cylinder pressure sensor 140A.

The diagram in an I stage of FIG. 7 shows a variation cycle where the output signal S2 from the cylinder pressure sensor 140A in the first cylinder 151 shows a maximum value or a minimum value.

As shown in the I stage of FIG. 7, after the opening or the closing of the plunger rod 410 (the fuel injector 400A), the cylinder pressure sensor 140A is affected by the oscillation due to the bounce of the plunger rod 410. In this state, the pressure detection element 142 (see FIG. 3) in the cylinder pressure sensor 140A oscillates at natural oscillation cycle.

The diaphragm 143 (see FIG. 3) at the end of the pressure detection element 142 is displaced in accordance with the oscillation of the pressure detection element 142 at the natural oscillation cycle, which causes the variation in the output signal S2 from the cylinder pressure sensor 140A.

As a result, during the period that the plunger rod 410 is in the bounce state, a peak (also, referred to as an extreme value) cycle, at which the output signal S2 from the cylinder pressure sensor 140A reaches the maximum value or the minimum value, becomes closer to the natural oscillation cycle.

Here, as shown in the I stage of FIG. 7, when the output signal S2 from the cylinder pressure sensor 140A has no periodic variation of the extreme values (the maximum value or the minimum value), or has a smaller periodic variation (longer cycle) of the extreme values, the output signal S2 from the cylinder pressure sensor 140A has a longer variation cycle. On the other hand, when the output signal S2 from the cylinder pressure sensor 140A has a larger periodic variation (shorter cycle) of the extreme values, the output signal S2 from the cylinder pressure sensor 140A has a shorter variation cycle. The embodiment exemplarily describes the case where, when the output signal S2 from the cylinder pressure sensor 140A has a shorter cycle of the extreme values, the cycle becomes closer to the natural oscillation cycle.

In the embodiment, a determination threshold is predetermined based on the variation cycle of the extreme values of the output signal S2 from the cylinder pressure sensor 140A. Based on the determination threshold, the overall controller 81 determines whether or not the output signal S2 from the cylinder pressure sensor 140A should be corrected. When the output signal S2 from the cylinder pressure sensor 140A goes below the determination threshold, the overall controller 81 corrects the output signal S2.

As has been described above, the overall controller 81 detects the noise at the closing of the plunger rod 410 (the fuel injector 400A) based on the natural oscillation cycle of the plunger rod 410, or based on natural oscillation frequency of the components between the cylinder pressure sensor 140A and the plunger rod 410. With this configuration, the overall controller 81 adequately detects the noise related to the bounce or the like that affects the output signal S2 from the cylinder pressure sensor 140.

Note that, the overall controller 81 may be configured to detect the noise (that occurs when the plunger rod 410 moves in the closing direction in the first cylinder 151) as the noise caused by the bounce at the closing of the plunger rod 410, in a case as follows: a case where the variation cycle, at which the output signal S2 from the cylinder pressure sensor 140A in the first cylinder 151 shows the extreme values, becomes constant in correspondence to the natural oscillation cycle of the plunger rod 410 or the natural oscillation cycle of the components between the cylinder pressure sensor 140A and the plunger rod 410 in the internal combustion engine 100.

With this configuration, the overall controller 81 detects the noise occurring when the plunger rod 410 moves in the closing direction, in the case where the variation cycle, at which the output signal S2 from the cylinder pressure sensor 140A in the first cylinder 151 shows the extreme values, becomes constant in correspondence to the natural oscillation frequency of the plunger rod 410 or the like. Accordingly, the overall controller 81 accurately detects the noise due to the bounce caused by the plunger rod 410 moving in the closing direction.

Note that, in order to detect the natural oscillation cycle with regard to the cylinder pressure sensor 140A as described above, the output signal S2 from the cylinder pressure sensor 140A is measured based on the Nyquist theorem, at a sampling cycle that is a half or less of the natural oscillation cycle.

The diagram in a J stage of FIG. 7 shows the output signal S2 from the cylinder pressure sensor 140A in the first cylinder 151, the output signal S2 having been corrected.

As shown in the J stage of FIG. 7, the overall controller 81 predetermines the correction period. The correction period predetermined starts from the timing at which the opening command pulse for the plunger rod 410 of the fuel injector 400A in the first cylinder 151 changes from 0 V to 5 V (the command for the drive of the plunger rod 410 starts). During the correction period, in a certain amount of time after the opening command pulse changes from 5 V to 0 V, the drive of the fuel injector 400A stops. Then, the correction period ends when the variation cycle of the output signal S2 from the cylinder pressure sensor 140A goes above the determination threshold (the timing at which the operating noise based on the drive of the fuel injector 400A ends).

During the correction period for the cylinder pressure sensor 140A, the overall controller 81 replaces the actual measured output signal S2 from the cylinder pressure sensor 140A (see the H stage of FIG. 7) with the output signal from the cylinder pressure sensor 140A that has been acquired before the opening command pulse starts changing from 0 V to 5 V.

In the embodiment, during the correction period for the cylinder pressure sensor 140A, the overall controller 81 linearly corrects the actual measured output signal from the cylinder pressure sensor 140A (see the H stage of FIG. 7) by using the output signal from the cylinder pressure sensor 140A that has been acquired at a predetermined time before the opening command pulse starts changing from 0 V to 5 V.

Further, the overall controller 81 additionally predetermines the correction period. The correction period is from the timing, at which the opening command pulse for the plunger rod 410 of the fuel injector 400C in the third cylinder 153 changes from 0 V to 5 V (the timing at which the fuel injection pulse starts) until the timing at which the opening command pulse changes from 5 V to 0 V (the timing at which the fuel injection pulse ends).

The correction period is positioned in a compression stroke or an expansion stroke of the internal combustion engine, and is within a range of adiabatic compression where both of the intake valve 6a and the exhaust valve 6b are closed. Then, as the correction, the overall controller 81 replaces the actual measured output signal S2 from the cylinder pressure sensor 140A (see the H stage of FIG. 7) with a pressure value calculated based on a change in cylinder volume of the first cylinder 151 (calculated using state equation). The change in the cylinder volume of the first cylinder 151 is calculated based on a change in the rotational angle (crank angle) of the crank shaft 123 that the crank angle sensor 121 has measured.

The overall controller 81 corrects the actual measured output signal S2 from the cylinder pressure sensor 140A by using the output signal S2 from the cylinder pressure sensor 140A that has been acquired before the opening command pulse is output, or by using the pressure value calculated using the state equation. As a result, the output signal S2 from the cylinder pressure sensor 140A (that has been corrected) is closer than the actual measured output signal S2 from cylinder pressure sensor 140A to the theoretical value of the output signal S2 from the cylinder pressure sensor 140A (see the G stage of FIG. 7).

Alternatively, the overall controller 81 may correct, in any one of the compression stroke and the expansion stroke, the output signal from the cylinder pressure sensor 140A in the first cylinder 151, based on the output signal S2 from the cylinder pressure sensor 140A in the first cylinder 151 that is output when the fuel injection pulse for the fuel injector 400C in the third cylinder 153 starts, and concurrently based on the theoretical value of the combustion pressure in the first cylinder 151 that is acquired when the fuel injection pulse for the fuel injector 400C in the third cylinder 153 ends.

With this configuration too, the overall controller 81 suppresses the error of the output signal S2 from the cylinder pressure sensor 140A in the first cylinder 151, based on the theoretical value of the combustion pressure in the first cylinder 151 that is acquired when the fuel injection pulse for the third cylinder 153 ends.

Note that, the method for correcting the output signal from the cylinder pressure sensor 140 by the overall controller 81 is not limited to the methods exemplified in the foregoing embodiment. For example, the overall controller 81 may correct the output signal by a linear correction process in periods immediately before and after the correction period that has been calculated based on the methods described above. Alternatively, the overall controller 81 may correct the output signal by using spline extrapolation or multidimensional curve fitting techniques.

Still alternatively, the overall controller 81 may correct the output signal S2 from the cylinder pressure sensor 140A in the first cylinder 151, based on the output signal from the cylinder pressure sensor 140A at the timing that the opening command pulse for the fuel injector 400C in the third cylinder 153 changes from 0 V to 5 V (the timing at which the fuel injector 400C opens).

With this configuration too, the overall controller 81 uses the output signal from the cylinder pressure sensor 140A before affected by the noise or the oscillation related to the drive of the third cylinder 153, so as to correct the output signal S2 from the cylinder pressure sensor 140A after affected by the noise or the oscillation related to the drive of the third cylinder 153. As a result, the overall controller 81 minimizes the error of the output signal S2 from the cylinder pressure sensor 140A.

Further, in the internal combustion engine 100, map data may be previously created and stored in the ROM 60 or the like. The map data correlatively describes what type of oscillation or noise is generated by which component (e.g., the fuel injector 400) in the internal combustion engine 100 and at what timing of the operating state of the internal combustion engine 100. The fuel injection controller 82 may read the map data from the ROM 60 to identify time for occurrence of the oscillation or noise of the component at the timing predetermined, and set the time as the correction period. During the correction period, the fuel injection controller 82 may carry out the correction previously described and adequately correct the output signal from the cylinder pressure sensor 140 at the operating state predetermined.

Additionally, the oscillation or the noise of the component is at high oscillation frequency, and thus the fuel injection controller 82 may pass the output signal from the cylinder pressure sensor 140 through a low pass filter in order to remove the oscillation and noise components from the output signal. In this case too, the output signal from the cylinder pressure sensor 140 may be adequately corrected.

Note that, the foregoing embodiment has exemplarily described the case where the detection error in the output signal from the cylinder pressure sensor 140 is corrected. Here, the detection error is caused by the oscillation related to the plunger rod 410 of the fuel injector 400 and/or the electromagnetic induction of the power line 400a due to the opening command pulse for the drive of the plunger rod 410; however, the component that causes the detection error is not limited thereto.

For example, in each of the cylinders 150, an intake valve and an exhaust valve are each disposed in a vicinity of the cylinder pressure sensor 140. When the intake valve or the exhaust valve is seated and closed, a bounce may be generated. The bounce may cause an oscillation that is to be transmitted to the cylinder pressure sensor 140, thereby resulting in the detection error in the output signal from the cylinder pressure sensor 140. In this case too, the fuel injection controller 82 may follow the correction method previously described to correct the output signal from the cylinder pressure sensor 140. As a result, the output signal corrected is closer to the theoretical value, and the fuel injection controller 82 suppresses the detection error.

For another example, in each of the cylinders 150, the spark coil 300 for supplying high voltage to the spark plug 200 is disposed in the vicinity of the cylinder pressure sensor 140. When the spark coil 300 discharges, a change in electromagnetic force may affect the signal line 140a connected to the cylinder pressure sensor 140. As a result, the detection error of the cylinder pressure sensor 140 may be increased. In this case too, the fuel injection controller 82 may follow the correction method previously described to correct the output signal from the cylinder pressure sensor 140. As a result, the output signal corrected is closer to the theoretical value, and the fuel injection controller 82 suppresses the detection error.

Note that, the foregoing embodiment has exemplarily described a relationship between the first cylinder 151 and the third cylinder 153; however, the correction may be similarly carried out in relationships between the other cylinders, each including the fuel injector 400, the intake valve, the exhaust valve, and the spark coil 300.

Additionally, with each component that has possibility of an oscillation source for the cylinder pressure sensor 140, the output signal from the cylinder pressure sensor 140 may be adequately corrected using a method similar to the methods previously described.

Note that, in the foregoing embodiment, the configuration, with which the overall controller 81 detects the noise generated at the drive of the components (e.g., the plunger rod 410), corresponds to a noise detection unit according to the present invention.

An exemplary embodiment of the present invention has been described above; however, in the present invention, all of the foregoing embodiments may be combined with each other, or any two or more of the foregoing embodiments may be preferably and arbitrarily combined.

In addition, the configurations described in the foregoing embodiment are merely illustrative, and the present invention is not limited thereto; therefore, the configurations described in the foregoing embodiment may be partially replaced with or may be replaced as those in other embodiments.

Further, the configurations described in the foregoing embodiment may be partially added to, deleted from, or replaced with those in other embodiments.

REFERENCE SIGNS LIST 1 electronic control unit (ECU)
10 analog input section
20 digital input section
30 A/D converter
40 RAM
50 MPU
60 ROM
70 I/O port
80 output circuit
81 overall controller
82 fuel injection controller
83 ignition controller
84 cylinder discrimination section
85 angle information generation section
86 rotational speed information generation section
87 Intake air amount measurement section
88 load information generation section
89 water temperature measurement section
100 internal combustion engine
110 air cleaner
111 intake pipe
112 intake manifold
113 throttle valve
113a throttle opening sensor
114 flow sensor
115 intake air temperature sensor
120 ring gear
121 crank angle sensor
122 water temperature sensor
123 crank shaft
125 accelerator pedal
126 accelerator position sensor
130 fuel tank
131 fuel pump
132 pressure regulator
133 fuel pipe
140 cylinder pressure sensor
410 plunger rod
150 cylinder
160 exhaust manifold
161 three-way catalyst
162 upstream air-fuel ratio sensor
163 downstream air-fuel ratio sensor
170 piston
200 spark plug
300 spark coil
400 fuel injector

The invention claimed is:

1. An internal-combustion-engine control device to control a fuel injector including a valve body that is movably disposed between a valve opening position and a valve closing position, provided for an internal combustion engine that includes a cylinder pressure sensor for detecting cylinder pressure in a combustion chamber, the internal-combustion-engine control device comprising:
a correction processing unit configured to correct an output signal from the cylinder pressure sensor, and a noise detection unit configured to detect a closing noise at a state that the valve body moves from the valve opening position to the valve closing position wherein the correction processing unit corrects the output signal from the cylinder pressure sensor in accordance with a correction period calculated based on drive of a component of the internal combustion engine, and the noise detection unit detects the closing noise in accordance with a natural frequency of the valve body or a natural frequency of a component disposed between the cylinder pressure sensor and the valve body.

2. The internal-combustion-engine control device according to claim 1, wherein the components include at least any one of the fuel injector, an intake valve, an exhaust valve, and a spark coil, each constituting the internal combustion engine, and the correction processing unit corrects the output signal from the cylinder pressure sensor in accordance with the correction period calculated based on drive of any one of the fuel injector, the intake valve, the exhaust valve, and the spark coil.

3. The internal-combustion-engine control device according to claim 1, wherein the internal combustion engine includes a plurality of cylinders, each including the fuel injector and a cylinder pressure sensor, and among the plurality of cylinders, the correction processing unit corrects an output signal from the cylinder pressure sensor disposed in one of the cylinders during a period between a timing that a fuel injection pulse for the fuel injector disposed in any other one of the cylinders starts and a timing that the fuel injection pulse ends.

4. The internal-combustion-engine control device according to claim 3, wherein the internal combustion engine has at least a compression stroke and an expansion stroke, and in any one of the compression stroke and the expansion stroke, the correction processing unit corrects the output signal from the cylinder pressure sensor disposed in one of the cylinders, based on the output signal from the cylinder pressure sensor disposed in one of the cylinders at the timing that the fuel injection pulse for the fuel injector disposed in any other one of the cylinders starts, and based on cylinder pressure in one of the cylinders at the timing that the fuel injection pulse for the fuel injector disposed in any other one of the cylinders ends.

5. The internal-combustion-engine control device according to claim 4, wherein in any one of the compression stroke and the expansion stroke, the correction processing unit corrects the output signal from the cylinder pressure sensor disposed in one of the cylinders, based on the output signal from the cylinder pressure sensor disposed in one of the cylinders at the timing that the fuel injection pulse for the fuel injector disposed in any other one of the cylinders starts, and based on a pressure value calculated in accordance with a crank angle until the timing that the fuel injection pulse for the fuel injector disposed in any other one of the cylinders ends.

6. The internal-combustion-engine control device according to claim 1, wherein the correction processing unit sets a period from a timing that a fuel injection pulse for the fuel injector disposed in one of cylinders starts until a timing that an operating noise based on drive of the fuel injector ends as the correction period, and corrects an output signal from a cylinder pressure sensor disposed in one of the cylinders in accordance with the correction period.

7. The internal-combustion-engine control device according to claim 1, wherein the correction processing unit corrects an output signal from a cylinder pressure sensor disposed in one of cylinders, based on the output signal from the cylinder pressure sensor at a timing that a fuel injection pulse for the fuel injector disposed in any other one of the cylinders starts.

8. The internal-combustion-engine control device according to claim 1, wherein the noise detection unit detects the closing noise in accordance with a cycle, in which an output signal from a cylinder pressure sensor disposed in one of cylinders reaches an extreme value.

9. The internal-combustion-engine control device according to claim 1, wherein the noise detection unit detects the closing noise as the closing noise in a case that a cycle, in which an output signal from a cylinder pressure sensor disposed in one of cylinders reaches an extreme value, becomes constant in correspondence to the natural frequency of the valve body or the natural frequency of the component disposed between the cylinder pressure sensor and the valve body.

10. The internal-combustion-engine control device according to claim 1, further comprising:

a sampling unit configured to sample an output signal from a cylinder pressure sensor disposed in one of cylinders, at a frequency equal to twice or more of the natural frequency of the valve body or the natural frequency of the component disposed between the cylinder pressure sensor and the valve body.

* * * * *